United States Patent [19]

Yoshida et al.

[11]  4,419,275
[45]  Dec. 6, 1983

[54] METHOD OF HYDROREFINING CATALYST MANUFACTURE

[75] Inventors: Shin-ichi Yoshida; Takemitu Yano; Hidehiro Higashi, all of Kitakyushu, Japan

[73] Assignee: Catalysts & Chemicals Industries Co., Ltd., Tokyo, Japan

[21] Appl. No.: 421,764

[22] Filed: Sep. 23, 1982

[30] Foreign Application Priority Data

Jun. 29, 1982 [JP] Japan .................. 57-112311

[51] Int. Cl.$^3$ .................. B01J 21/04; B01J 23/85
[52] U.S. Cl. .................. 502/322; 502/323; 502/332; 502/335
[58] Field of Search .................. 252/465

[56] References Cited

U.S. PATENT DOCUMENTS 3,864,461  2/1975  Miller et al. .................. 252/465 X
3,923,646 12/1975  Hilfman .................. 252/465 X
4,113,656  9/1978  Riley et al. .................. 252/465 X Primary Examiner—W. J. Shine
Attorney, Agent, or Firm—Flynn, Thiel, Boutell & Tanis

[57]  ABSTRACT

A catalytic composite of Group VIB metal, Group VIII metal and a porous alumina carrier material is manufactured by controlling a water of hydration of pseudo-boehmite contained in an amorphous alumina hydrate slurry in the range of 1.20–1.50 mols per mol of $Al_2O_3$; forming an alumina hydrate obtained from this slurry into alumina particles and drying; and then calcining the alumina particles in a steam-containing atmosphere to thereby obtain a porous alumina carrier material, the resulting porous alumina carrier material being subsequently incorporated with catalytically effective amounts of a Group VIB metal compound and a Group VIII metal compound.

5 Claims, 1 Drawing Figure

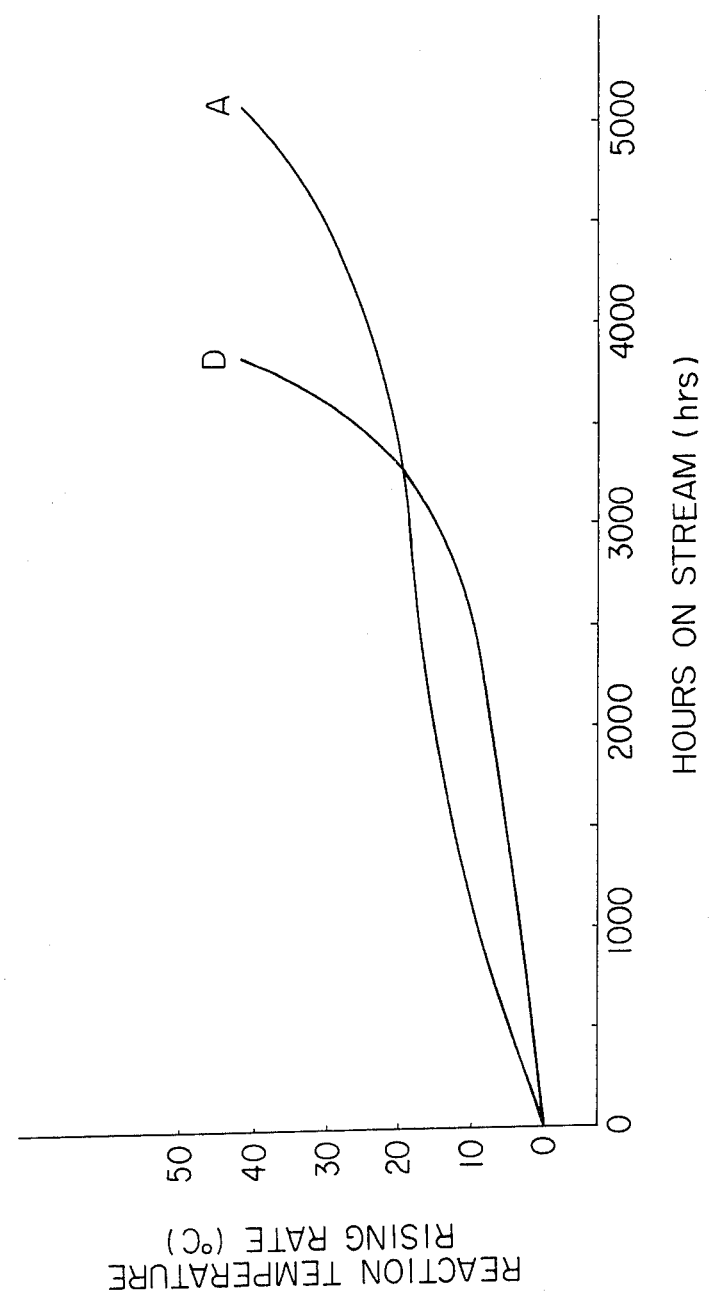

METHOD OF HYDROREFINING CATALYST MANUFACTURE

BACKGROUND OF THE INVENTION

The present invention relates to the method of manufacturing a hydrorefining catalyst, in particular relates to the method of manufacturing a catalyst suitably employed in the hydrodesulfurization process which comprises treating a hydrocarbon feed stock containing a sulfur compound and a relatively large amount of contaminants that deactivate the catalytic composite, in particular a residual oil, in the presence of hydrogen.

In general, the hydrorefining catalyst comprises carrying a hydrogenating metal component on a porous alumina. Said hydrogenating metal component includes one metal component selected from Group VIB and one or more of metal components selected from Group VIII of Periodic Table. The activity of the hydrorefining catalyst deteriorates, in the initial stage of treating a heavy hydrocarbon oil, mainly due to the separation of carbonaceous substances on the catalyst surface, said carbonaceous substances being resultant from decomposition of asphaltenes contained in the feed stock, and the activity more deteriorates as the treating time is prolonged. This is because vanadium and nickel compounds bound with asphaltenes come to deposit on the catalyst surface with the lapse of time. Accordingly, in proportion to the tendency that the hydrocarbon feed stock is becoming heavy, there is an aceute demand for a hydrorefining catalyst that is resistable against metal contaminants containing vanadium and nickel and is capable of holding a high desulfurization activity for a long period of time.

The activity of the catalyst utilized in catalytic hydrorefining, in particular hydrodesulfurization, of heavy hydrocarbon oils is in close contact with the pore volume, pore distribution and pore diameter of the catalyst, and the pore distribution and pore diameter of the catalyst are, as a matter of course, influenced by the pore volume, pore distribution and pore diameter of the porous alumina utilized as the carrier material for the catalyst. Generally speaking, the porous alumina utilized as the carrier material for the hydrorefining catalyst may be made from pseudo-boehmite, but Japanese Patent Publication No. 35893/1981 Specification discloses that the use of an alumina hydrate containing a pseudo-boehmite having a crystal size grown in the range of 40–80 Å as a precursor of a porous alumina permits to obtain alumina wherein the greater part of the total pore volume is occupied by pores having a pore diameter of 600 Å or less.

On the other hand, Japanese Laid Open Patent Application No. 27036/1980 Specification discloses a hydrodesulfurizing catalyst comprising a porous alumina carrier and Group VIB and VIII metal components carried thereon, wherein the average pore diameter measured by nitrogen adsorption method is in the range of 100–130 Å and the pore volume of pores having a diameter of 90–140 Å occupies 70% of the pore volume of pores having a diameter up to 600 Å, and mentions that this hydrodesulfurizing catalyst can exhibit a high desulfurizing activity because it prevents entrance of asphaltenes bound with metal contaminants into pores.

SUMMARY OF THE INVENTION

The present invention provides a method of manufacturing a hydrorefining catalyst, in particular a hydrodesulfurizing catalyst, which can hold a high desulfurizing activity for a long period of time even when asphaltenes containing metal contaminants enter into pores, whereby vanadium and nickel deposit on the catalyst.

In other words, the method of manufacturing a hydrorefining catalyst according to the present invention comprises the steps of controlling a water of hydration of pseudo-boehmite contained in an amorphous alumina hydrate slurry in the range of 1.20–1.50 mols per mol of $Al_2O_3$; forming an alumina hydrate obtained by dehydrating this slurry into alumina particles having desired shape and dimensions and drying; then calcining the alumina particles in a steam-containing atmosphere into a porous alumina; and thereafter carrying catalytically effective amounts of hydrogenating metal components on this porous alumina.

BRIEF DESCRIPTION OF THE DRAWING

The appended drawing is a graph illustrating catalyst life evaluation test results obtained from Catalyst A manufactured according to the present invention and Control Catalyst D.

DETAILED DESCRIPTION OF THE INVENTION

The amorphous alumina hydrate slurry may be prepared in a usual manner, and typically prepared by mixing a solution of sodium aluminate with a solution of acid aluminate such as a solution of aluminum sulfate. The pseudo-boehmite contained in the thus obtained amorphous alumina hydrate slurry is unsuited for a precursor of the porous alumina carrier material of the present invention because the water of hydration of said pseudo-boehmite is about 1.8 mols per mol of $Al_2O_3$. According to the present invention, therefore, the amount of water of hydration of the pseudo-boehmite present in the slurry is controlled in the range of 1.20–1.50 mols per mol of $Al_2O_3$. Controlling of the water of hydration is effected by removing a by-product salt from said amorphous alumina hydrate slurry and thereafter stirring the slurry under the conditions: pH 8–12 and temperature 50° C. or more, preferably 80° C. or more. The stirring time depends upon the pH and temperature of the slurry. However, it may generally be said that the water of hydration of pseudo-boehmite can be controlled in the range of 1.20–1.50 mols per mol of $Al_2O_3$ by stirring for a period of about 3–150 hours.

The slurry of pseudo-boehmite controlled in the amount of water of hydration is then dehydrated and thereafter formed into alumina particles having desired shape and dimensions and dried. Thereafter, the dried alumina particles are calcined at a temperature of 400°–800° C., preferably 550°–700° C., for 1–10 hours in an atmosphere containing 20 mol% or more, preferably 40 mol% or more of steam. Calcining of the alumina particles in the presence of steam is very important to the present invention as well as controlling of the water of hydration of pseudo-boehmite.

As stated previously, from the pseudo-boehmite whose water of hydration is in the range of 1.20–1.50 mols per mol of $Al_2O_3$ there can be obtained the porous alumina in which the pore volume of pores having a diameter of 600 Å or less occupies the greater part of the total pore volume and additionally the pore size distribution is narrow. However, so far as calcining of the pseudo-boehmite is effected in the air according to the prior art method, the resulting porous alumina takes the pore shape of ink bottle where the inside diameter is larger than the port diameter. However, when calcining of the pseudo-boehmite is effected in the atmosphere containing at least 20 mol% of steam like the present invention, there can be obtained the porous alumina having cylindrical pores where the port diameter has substantially the same width as the inside diameter. In this connection, it is to be noted that the porous alumina obtained according to the method of the present invention is featured in that the average pore diameter is in the range of 130–170 Å, the pore volume of pores having a diameter of 0–600 Å is 0.60 ml/g or more, the pore volume of pores having a diameter of 130–200 Å occupies 50% or more of the pore volume of pores having a diameter of 0–600 Å, and the pore volume of pores having a diameter of 0–60 Å is 5% or less of the pore volume of pores having a diameter of 0–600 Å.

In the hydrorefining catalyst using the porous alumina as carrier material, when the pores of the porous alumina take the shape of ink bottle, the catalyst activity decays in a relatively short time because the port of the pore is blocked up only by deposition of a small amount of metal contaminants present in the feed stock on the catalyst, whilst when the pores of the porous alumina take the shape of cylinder whose port diameter is enlarged, the catalyst is allowed to hold a high activity for a long period of time because blocking up of the pore does not take place even when metal contaminants somewhat deposit in the vicinity of the port of the pore.

According to the method of the present invention, it is possible to deposite the hydrogenating metal active components on the porous alumina obtained by calcination in the presence of steam. In this instance, as the metal active components there can be used one metal component selected from Group VIB metals and at least one metal component selected from Group VIII metals of Periodic Table. Typically, as the VIB metal is selected molybdenum or tungsten and as the Group VIII metals are selected nickel and cobalt. Deposition of the metal active components on the porous alumina is effected by the prior art method, for instance, such as kneading method, impregnation method or the like. Preferably, the amount of the Group VIB metal deposited is in the range of 8–20 wt.% of the final catalyst on the basis of metal oxide and the amount of the Group VIII metal deposited is in the range of 0.1–5 wt.% of the final catalyst on the basis of metal oxide. The typical hydrorefining catalyst according to the present invention contains the nickel component in the range of 0.5–3 wt.% on the basis of NiO, the cobalt component in the range of 0.5–3 wt.% on the basis of CoO, and the molybdenum component in the range of 10–15 wt.% on the basis of $MoO_3$.

The hydrorefining catalyst of the present invention, which comprises depositing the metal active component on the porous alumina, is subjected to drying, calcining and activating treatments according to the prior art method, and thus can be used in the hydrodesulfurization of heavy hydrocarbon oils, in particular residual oils. The hydrodesulfurization of residual oils is generally effected using a fixed-bed reactor under the conditions: temperature 330° C.–450° C., hydrogen pressure 60–210 Kg/cm$^2$, liquid hourly space velocity (LHSV) 0.1–1.5 and hydrogen/oil ratio 300–3000.

EXAMPLE 1

80 Kg of a solution of sodium aluminate containing 5.0 wt.% alumina were poured into a 200 l-stainless tank and heated to 60° C. This solution was maintained at 60° C. with stirring and added with 280 g of a 50 wt.% gluconic acid aqueous solution. Then, a 2.5 wt.% alumina-containing aluminum sulfate solution heated to 60° C. was added thereto in about 10 minutes, thereby obtaining a slurry having the pH 7.0. The amount of the aluminum sulfate solution required for obtaining the slurry having the pH 7.0 was 94 Kg. This slurry was filtered. The thus obtained filter cake was washed with a 0.2 wt.% ammonia water heated to 50° C. for removing a by-product salt, thereby obtaining a pseudo-boehmite-containing amorphous alumina hydrate (a). The water of hydration of this amorphous alumina hydrate (pseudo-boehmite) was 1.80 mols.

The above mentioned alumina hydrate (a) was added with a small amount of ammonia water to thereby obtain a slurry having the alumina concentration 8.8 wt.% and the pH 10.5. This slurry was received in a container equipped with a reflux condenser and a stirrer and stirred at 90° C. for 20 hours. Thereafter, 20 Kg of the slurry were transferred to a 30 l-kneader and kneaded with heating, thereby obtaining a plasticizable alumina cake (b). The water of hydration of this alumina cake (b) was 1.42 mols.

This alumina cake (b) was extruded into a 1.6 mm$\phi$-cylindrical body, and this cylindrical body was dried at 110° C. for 16 hours. The resulting dry cylindrical body was received in a furnace where the amounts of air and steam fed therein can be controlled, and calcined at 650° C. for 3 hours in a 40 mol% steam-containing atmosphere, thereby obtaining a porous alumina carrier material. The physical characteristics of this alumina carrier material are as shown below:

Volume of pores having diameters 0–600 Å = 0.72 ml/g.

$$\frac{\text{Volume of pores having diameters 130-200 Å}}{\text{Volume of pores having diameters 0-600 Å}} = 0.63$$

$$\frac{\text{Volume of pores having diameters 0-60 Å}}{\text{Volume of pores having diameters 0-600 Å}} = 0.03$$

Average pore diameter = 141 Å

Specific surface area = 177 m$^2$/g

Next, 60.0 g of ammonium paramolybdate, 20.0 g of cobalt nitrate and 24.7 g of nickel nitrate were dissolved in ammonia water to obtain a solution of the gross volume 360 ml. This solution was poured in a container having received 500 g of the above mentioned porous alumina carrier material therein and held under reduced pressure for impregnating the alumina carrier material. Thereafter, it was dried at 110° C. for 1 hour with rotating, and in succession calcined at 550° C. for 1 hour. The obtained catalyst was observed to have the pore volume of 0.63 ml/g and the specific surface area of 170 m$^2$/g and to contain 1.1 wt.% of nickel component on the basis of NiO, 0.9 wt.% of cobalt component on the basis of CaO and 10.5 wt.% of molybdenum component on the basis of $MoO_3$. This catalyst was named Catalyst A.

EXAMPLE 2

The amorphous alumina hydrate (a) prepared by the same procedure as Example 1 was added with water and 15 wt.% ammonia water to thereby obtain a slurry having the alumina concentration 9.2 wt.% and the pH 10.9. 80 Kg of this slurry were received in a container equipped with a reflux condenser and a stirrer and stirred at 95° C. for 72 hours. 20 Kg of the resulting alumina hydrate slurry were transferred to a 30 l-kneader and kneaded with heating, thereby obtaining a plasticizable alumina cake. The water of hydration of this alumina cake was 1.23 mols. This alumina cake was extruded into a 1.6 mm$\phi$-cylindrical body. Then, this cylindrical body was dried at 110° C. for 16 hours, and thereafter calcined at 600° C. for 3 hours in an atmosphere containing 57 mol% steam by means of the same furnace as used in Example 1, thereby obtaining a porous alumina carrier material. The physical characteristics of this alumina carrier material are as shown below:

Volume of pores having diameters 0–600 Å = 0.72 ml/g $$\frac{\text{Volume of pores having diameters 130–200 Å}}{\text{Volume of pores having diameters 0–600 Å}} = 0.80$$

$$\frac{\text{Volume of pores having diameters 0–60 Å}}{\text{Volume of pores having diameters 0–600 Å}} = 0.01$$

Average pore diameter = 150 Å

Specific surface area = 168 m$^2$/g 500 g of the above porous alumina carrier material was impregnated with an aqueous solution of molybdenum trioxide in ammonia water under reduced pressure, and then dried at 120° C. In succession, same was impregnated with an aqueous solution of cobalt nitrate, dried and calcined, thereby preparing Catalyst B. Catalyst B was observed to have the pore volume of 0.62 ml/g and the specific surface area of 162 m$^2$/g and to contain the metal active components in the amounts of 3.75 wt.% on the basis of CoO and 12.5 wt.% on the basis of MoO$_3$.

Comparative Example 1

A slurry was obtained by adding water to the amorphous alumina hydrate (a) obtained by the same procedure as used in Example 1. This slurry was itself sprayed and dried to thereby obtain 67.2 wt.% alumina-containing powder. 3.5 Kg of said powder was added with 3500 ml of 7.5 wt.% ammonia water and kneaded into a plasticizable alumina cake. Thereafter, this cake was extruded into a 1.6 mm$\phi$-cylindrical body. Then, this cylindrical body was dried at 110° C. for 16 hours. The dry cylindrical body was subjected 3 hours' calcination at 650° C. in the air, thereby obtaining a porous alumina carrier material. The physical characteristics of this alumina carrier material are as shown below:

Volume of pores having diameters 0–600 Å = 0.62 ml/g $$\frac{\text{Volume of pores having diameters 130–200 Å}}{\text{Volume of pores having diameters 0–600 Å}} = 0.16$$

$$\frac{\text{Volume of pores having diameters 0–60 Å}}{\text{Volume of pores having diameters 0–600 Å}} = 0.26$$

Average pore diameter = 93 Å

Specific surface area = 240 m$^2$/g

Nickel, cobalt and molybdenum components were then deposited on the above mentioned porous alumina carrier material according to the exactly same procedure as Example 1 to thereby obtain Catalyst C. Catalyst C was observed to have the pore volume of 0.52 ml/g and the specific surface area of 227 m$^2$/g, and to be identical in the amounts of metal active components with Catalyst A.

Comparative Example 2

A porous alumina carrier material was obtained by repeating the exactly same procedure as Example 1 except that the dry cylindrical body was subjected to 3 hours' calcination at 550° C. in the air in place of 3 hours' calcination at 650° C. in the presence of steam. The physical characteristics of this alumina carrier material are as shown below:

Volume of pores having diameters 0–600 Å = 0.72 ml/g $$\frac{\text{Volume of pores having diameters 130–200 Å}}{\text{Volume of pores having diameters 0–600 Å}} = 0.31$$

$$\frac{\text{Volume of pores having diameters 0–60 Å}}{\text{Volume of pores having diameters 0–600 Å}} = 0.15$$

Average pore diameter = 120 Å

Specific surface area = 224 m$^2$/g

Nickel, cobalt and molybdenum components were then deposited on the above mentioned porous alumina carrier material according to the exactly same procedure as Example 1 to thereby obtain Catalyst D. Catalyst D was observed to have the pore volume of 0.63 ml/g and the specific surface area of 211 m$^2$/g, and to be identical in the amounts of metal active components with Catalyst A.

Comparative Example 3

A solution of sodium aluminate containing 5.0 wt.% alumina and a solution of aluminum sulfate containing 2.5 wt.% alumina were mixed to prepare an amorphous alumina hydrate slurry. This slurry was added with chi-alumina, and same was treated at 180° C. for 20 hours in an autoclave. This slurry was filtered to obtain a filter cake. This filter cake was washed with ammonia water, thereby obtaining a pseudo-boehmite-containing alumina hydrate, the water of hydration of said pseudo-boehmite being 1.14 mols. Next, this alumina hydrate was transferred to a kneader and kneaded therein at elevated temperature, thereby obtaining an alumina cake. Thereafter, this alumina cake was extruded into a 1.6 mm$\phi$ cylindrical body. This cylindrical body was dried at 110° C. for 16 hours. This dry cylindrical body was calcined at 550° C. for 3 hours in the air to thereby obtain a porous alumina carrier material. The physical characteristics of this alumina carrier material are as shown below:

Volume of pores having diameters 0–600 Å = 0.69 ml/g $$\frac{\text{Volume of pores having diameters 130–200 Å}}{\text{Volume of pores having diameters 0–600 Å}} = 0.17$$

$$\frac{\text{Volume of pores having diameters 0–60 Å}}{\text{Volume of pores having diameters 0–600 Å}} \leq 0.01$$

Average pore diameter = 230 Å

Specific surface area = 148 m$^2$/g

Nickel, cobalt and molybdenum components were then deposited on this porous alumina carrier material according to the exactly same procedure as Example 1 to thereby prepared Catalyst E. Catalyst E was observed to have the pore volume of 0.60 ml/g and the specific surface area of 141 m²/g, and to be identical in the amounts of metal active components with Catalyst A.

Comparative Example 4

The dry cylindrical body obtained according to the procedure of Comparative Example 1 was calcined at 650° C. for 3 hours in an atmosphere containing 40 mol% steam to thereby obtain a porous alumina carrier material. The physical characteristics of this alumina carrier material are as shown below:

Volume of pores having diameters 0–600 Å = 0.62 ml/g $$\frac{\text{Volume of pores having diameters 130-200 Å}}{\text{Volume of pores having diameters 0-600 Å}} = 0.21$$

$$\frac{\text{Volume of pores having diameters 0-60 Å}}{\text{Volume of pores having diameters 0-600 Å}} = 0.19$$

Average pore diameter = 103 Å

Specific surface area = 232 m²/g

Nickel, cobalt and molybdenum components were then deposited on the aforesaid porous alumina carrier material according to the exactly same procedure of Example 1 to thereby prepare Catalyst F.

Catalyst F was observed to have the pore volume of 0.51 ml/g and the specific surface area of 225 m²/g and to be identical in the amounts of metal components with Catalyst A.

EXAMPLE 3

Hydrodesulfurization of Kuwait topped crude was effected using Catalyst A to Catalyst F obtained in the respective examples and comparative examples, wherein a fixed-bed reactor with an outside diameter of 27 mmφ, an inside diameter of 19 mmφ and a length of 3 m was employed and the amount of each catalyst used was 150.0 g. The properties of feed stock and test conditions are shown in Table I and Table II respectively. And, the properties of product oil after the lapse of 100 hours on stream are shown in Table III.

TABLE I

| Properties of feed stock | |
|---|---|
| Specific gravity (15/4° C.) | 0.973 |
| Sulfur content (wt. %) | 4.3 |
| Nitrogen content (ppm) | 2100 |
| Asphaltene content (wt. %) | 3.9 |
| Vanadium content (ppm) | 59.0 |
| Nickel content (ppm) | 15.5 |

TABLE II

| Test conditions | |
|---|---|
| Reaction temperature (°C.) | 380 |
| Pressure (Kg/cm²) | 150 |
| LHSV (hr⁻¹) | 1.0 |
| Hydrogen/oil ratio (Nm³/Kl) | 700 |
| Hydrogen concentration (mol %) | 90 |

TABLE III

| | Properties of product oil after 100 hours on stream | | | | | |
|---|---|---|---|---|---|---|
| | Catalyst | | | | | |
| | A | B | C | D | E | F |
| Specific gravity (15/4° C.) | 0.916 | 0.916 | 0.920 | 0.917 | 0.917 | 0.919 |
| Sulfur content (wt. %) | 0.82 | 0.88 | 1.03 | 0.74 | 1.08 | 1.05 |
| Desulfurization ratio (%) | 80.9 | 79.5 | 76.0 | 82.8 | 74.9 | 75.6 |
| Nitrogen content (ppm) | 1100 | 1100 | 1100 | 1100 | 1100 | 1100 |
| Asphaltene content (wt. %) | 1.2 | 1.2 | 2.0 | 1.5 | 1.1 | 2.0 |
| Vanadium content (ppm) | 10.5 | 11.2 | 17.2 | 15.6 | 10.5 | 17.0 |
| Nickel content | 5.1 | 5.2 | 7.3 | 6.6 | 4.9 | 7.3 |
| Demetalling ratio (%) | 79.1 | 78.0 | 67.1 | 70.2 | 79.3 | 67.4 |

It is evident from the test results shown in Table III that Catalyst A and Catalyst B prepared according to the method of the present invention are higher in desulfurizing activity than Catalyst C and Catalyst E using the porous alumina carrier material obtained by calcining, in the air, the pseudo-boehmite having the water of hydration deviating from the range of 1.20–1.50 mols. Catalyst D is not inferior in respect of the desulfurizing activity as compared with Catalyst A and Catalyst B at the lapse of 100 hours on stream, but can not surpass the catalyst prepared by the method of the present invention in respect to the catalyst life as shown in Example 4 referred to afterwards.

EXAMPLE 4

Catalyst A and Catalyst D were examined in respect of the catalyst life. The test conditions employed herein were exactly the same as Example 3 except that the hydrogen/oil ratio was 1000 Nm³/Kl, the hydrogen concentration was 80 mol% and further the reaction temperature was elevated in proportion to lowering of the catalytic activity so that the sulfur content in the product oil may always be maintained less than 1.0 wt.% throughout the test period.

The obtained test results are shown in the accompanying drawing. As is evident from the drawing, Catalyst D exhibits a higher activity than Catalyst A before the lapse of about 3200 hours on stream, but its activity deteriorates rapidly after the lapse of 3500 hours on stream. In contrast, Catalyst A prepared according to the method of the present invention can maintain the activity in a high degree even after the lapse of 3500 hours on stream.

After the completion of the life test, the amounts of vanadium, nickel, carbon and sulfur deposited on the respective catalyst were measured. The amounts of components deposited on fresh catalysts are shown by weight in Table IV.

TABLE IV

| | Deposits on catalysts | |
|---|---|---|
| Catalyst | A | D |
| Vanadium | 24.5 | 17.0 |
| Nickel | 5.4 | 4.2 |
| Carbon | 18.3 | 13.5 |

TABLE IV-continued

| Catalyst | Deposits on catalysts | |
|---|---|---|
| | A | D |
| Sulfur | 26.2 | 20.1 |

As is evident from data shown in Table IV, it is worthy of attention that for all that Catalyst A carries thereon larger amounts of metal contaminants such as vanadium, nickel and the like than Catalyst D does, Catalyst A has a desulfurizing activity life more prolonged than that of Catalyst D as indicated in the drawing.

We claim:

1. A method of manufacturing a hydrorefining catalyst of an alumina carrier material and hydrogenating metal components deposited thereon which comprises controlling a water of hydration of pseudo-boehmite contained in an amorphous alumina hydrate slurry in the range of 1.20–1.50 mols per mol of $Al_2O_3$; forming an alumina hydrate obtained from this slurry into alumina particles of desired shape and dimensions and drying; then calcinating the alumina particles in an atmosphere containing steam to thereby prepare a porous alumina carrier material; and depositing hydrogenating metal components on this porous alumina carrier material.

2. The method according to claim 1 wherein said amorphous alumina hydrate slurry is stirred while being held under the conditions: pH 8–12 and temperature 50° C. or more so as to control the water of hydration of pseudo-boehmite contained in said slurry in the range of 1.20–1.50 mols per mol of $Al_2O_3$.

3. The method according to claim 1 wherein said alumina particles are calcined at a temperature of 400°–800° C. for 1–10 hours in an atmosphere containing 20 mol% or more of steam to thereby obtain a porous alumina in which the average pore diameter is in the range of 130–170 Å, the volume of pores having diameters 0–600 Å is 0.60 ml/g or more, the volume of pores having diameters 130–200 Å occupies 50% or more of the volume of pores having diameters 0–600 Å, and the volume of pores having diameters 0–60 Å is 5% or less of the volume of pores having diameters 0–600 Å.

4. The method according to claim 1 wherein said hydrogenating metal components comprises one metal component selected from Group VIB metals and at least one or more components selected from Group VIII metals of Periodic Table.

5. The method according to claim 4 wherein the metal component selected from Group VIB metals of Periodic Table is molybdenum or tungsten and the metal components selected from Group VIII metals of Periodic Table are nickel and/or cobalt.

* * * * *